Dec. 2, 1958  E. H. GIBSON  2,862,373
TRANSMISSION JOINT
Filed Nov. 29, 1957

Inventor:-
Edward Harry Gibson

Watson, Cole, Grindle & Watson,
Attorneys

United States Patent Office 2,862,373
Patented Dec. 2, 1958

2,862,373

TRANSMISSION JOINT

Edward H. Gibson, Coventry, England

Application November 29, 1957, Serial No. 699,683

7 Claims. (Cl. 64—9)

This invention relates to joints for transmitting rotary movement of the kind in which two complementary rotary joint members have eccentric dogs or projections extending therefrom which all lie on a common circle and alternately interlocate between one another, whilst balls are retentively disposed between adjacent faces of said projections whereby the joint members are rendered rotationally fast for transmitting rotary movement yet are permitted relative sliding movement and/or inclination.

The object of the invention is to provide a simple inexpensive and compact anti-friction joint of the above mentioned kind affording a substantial extent of at least sliding movement or preferably both universal inclination and sliding movement, as required as well as possessing constant velocity characteristics.

Figure 1:
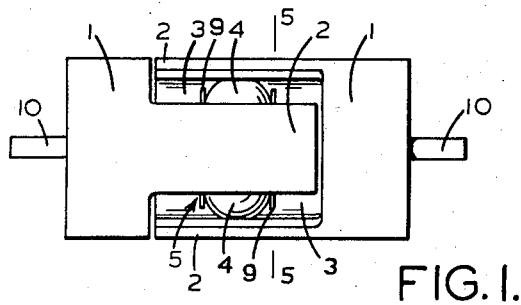
Figure 4:
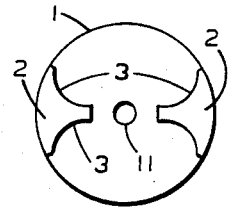
Figure 2:
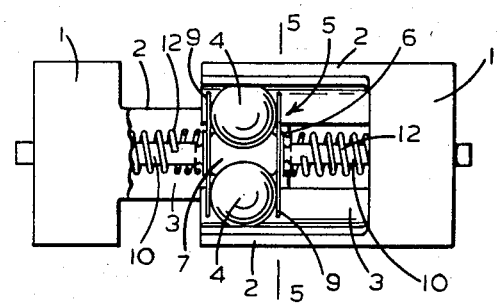
Figure 5:
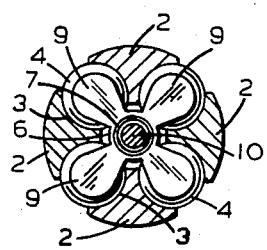
Figure 3:
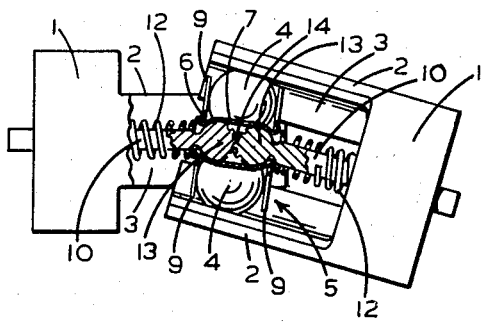
Figure 6:
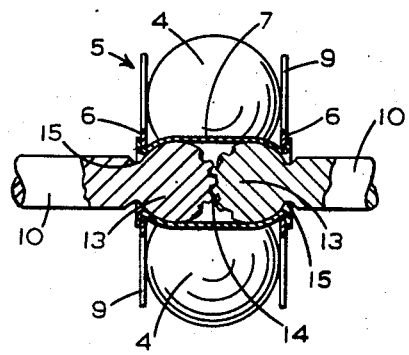
Figure 7:
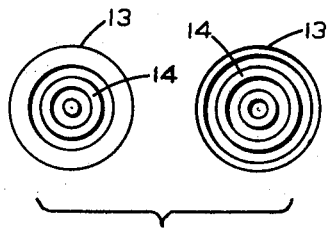

In the accompanying drawings:

Figure 1 is a side view of a joint according to this invention in an axially contracted condition, Figure 2 is a view similar to Figure 1 but partly broken away showing the joint in an axially extended condition, Figure 3 is a view similar to Figure 2 but partly in section and showing the joint extended and also having a universal action, Figure 4 is an end view of one of the joint members per se, Figure 5 is a cross sectional view on the line 5—5 of Figure 1 or Figure 2, Figure 6 is a sectional side view on an enlarged scale of the ball carrying and locating cage shown per se, and Figure 7 shows end views on a further enlarged scale of the mating heads of the pins shown in Figures 3 and 6.

Referring to the drawings a simple form of joint embodying this invention is shown and consists of a pair of rotary joint members 1, each adapted to be connected to a rotary member such as a shaft (not shown) or if desired each joint member may be integral with a shaft or the like.

Each joint member 1 has a pair of equi-spaced or diametrically arranged projections, prongs or dogs 2 that lie on a common circle about the axis of the joint member whilst the said projections 2 are parallel with said axis.

The joint members 1 are identical as regards at least the form and arrangement of the projections 2 and when the joint is assembled the projections of one member locate between the projections of the other member with clearance and in an alternating manner about the centre or axis of the joint.

The adjacent faces of the projections 2 are suitably grooved to provide races or guideways 3 for balls 4 that are disposed between the projections 2 at each set of adjacent faces or races 3 of the latter. In the particular embodiment of this invention now described and shown where each joint member 1 has a pair of projections 2 (Figure 4) four sets of adjacent straight races 3 are provided each having at least one ball 4 disposed between them so that in this instance a minimum of four balls is necessary (Figure 5).

The projections 2 and the races 3 therein are of a form and extent such that the balls 4 are retained between them for which purpose the grooves forming the races 3 are of round or part cylindrical form parallel with the axes of their respective joint members whereby, when the joint members are co-axially aligned, adjacent races 3 each have a common axis through the centre of the ball 4 therebetween for a substantial extent of driving contact with each ball which axis is eccentric to the main axis of the joint whilst the said eccentric axes of the four sets of adjacent races 3 lie on a common circle about the said main axis (Figure 5).

Where the joint is required to serve as a sliding joint only in which the joint members 1 remain co-axial it will be appreciated that the arrangement of projections 2 and balls 4 therebetween renders the joint members 1 rotationally fast for transmitting a drive yet permits them relative axial or sliding movement for a limited extent.

When a universal joint is required one ball 4 is employed between the adjacent races 3, of each set thereof whilst the balls (four in number in the particular example shown) are retained in a common radial plane by a cage 5 or like member which allows the balls 4 some freedom of movement.

In the example shown the cage 5 consists of a pair of spiders 6 (Figures 3 and 6) spaced apart by a hub 7, radial members such as the fingers or blades 9 of each spider radiating from the hub 7 between the projections 2 and resiliently gripping the balls 4 with light pressure so as to allow rotation of the latter and also slight radial movement. In this way the balls are permitted some freedom of movement to accommodate themselves to the relative movement of the inter-locating projections 2. If desired the fingers 9 may be dished or cupped for locating engagement with their respective balls 4.

The cage 5 is located with respect to both joint members 1 such as by means of the pins 10 slidably engaging co-axial bores 11 in said joint members.

For the purposes of universal action of the joint the cage 5 may be spring urged to a substantially central position such as by means of the compression springs 12 about each pin 10 and each acting between a spider 6 and an adjacent inner end of the body of a corresponding joint member 1.

In a refinement of a joint embodying this invention and further in accordance with the latter means are provided to ensure that the cage 5 and balls 4 carried thereby assume the correct position in accordance with the particular angle between the axes of the joint members (Figure 3) so that the joint operates freely and easily with an absence or minimum of any binding action of the balls 4 in their races 3.

For this purpose the pins 10 are provided with spherical or like heads 13 which are socketed in the hollow interior of the hub 7. The heads have an inter-engagement and in the example shown opposed ends thereof are annularly ribbed and grooved at 14 (Figure 7) in a complementary manner such that the ribs of one head 13 engage the grooves of the other head. In this way the heads 13 may have a limited intermeshing action after the manner of gear members but in any radial direction so that such meshing may take place regardless of the relative inclination of the joint members 1 and hence the pins 10. The effect of such meshing action of the heads 13 on relative inclination of the joint members 1 is to cause the cage 5 to be moved whereby its radial plane and that of the centres of the balls 4 moves through substantially half the angle between the axes of the joint members 1 so that the said radial plane of the balls 4 and cage 5 bisects the angle of inclination between the said axes of the joint members 1.

It will be appreciated that the said meshing action of the heads 13 causes the cage 5 to automatically adopt the required position according to the angle between the joint members 1 and thus ensures that the balls 4 are correctly situated for proper universal action of the joint. In the example shown each pin 10 is annularly grooved at 15 (Figure 7) at its junction with its respective heads 13 to give ample clearance for universal movement of the head in the hub 7.

By the construction of joint herein described and shown limited inclination or universal movement of one joint member relative to the other is permitted whilst if required limited sliding movement of one joint member in relation to the other is also possible so that the joint may serve simultaneously as both a universal and a sliding joint with a constant velocity action of the joint members.

Whilst the above described example of joint according to this invention makes reference to two projections 2 per joint member 1, it will be appreciated that more than two projections 2 thereon, appropriately formed and spaced with a corresponding number of balls 4, can be employed consistent with the size of the joint.

I claim:

1. A transmission joint of the character described comprising a pair of rotary joint members each having eccentric axially parallel projections extending therefrom, said projections of said joint members all lying on a common circle and alternately interlocating with clearance between one another whilst said projections are provided with straight ball races of part cylindrical form having their axes parallel to that of the joint member from which they extend; balls retentively disposed between adjacent races of said interlocating projection such that the axes of the part cylindrical races of each adjacent pair thereof pass substantially through the centre of the ball therebetween for a substantial extent of driving contact with each ball in order to render the joint members rotationally fast; and a cage for retaining the balls in a substantially common radial plane whereby relative sliding movement and/or inclination of the joint members is permitted.

2. A transmission joint of the character described comprising a pair of rotary joint members each having eccentric axially parallel projections extending therefrom, said projections of said joint members all lying on a common circle and alternately interlocating with clearance between one another whilst said projections are provided with straight ball races of part cylindrical form having their axes parallel to that of the joint member from which they extend; balls retentively disposed between adjacent races of said interlocating projections such that the axes of the part cylindrical races of each adjacent pair thereof pass substantially through the centre of the ball therebetween for a substantial extent of driving contact with each ball in order to render the joint members rotationally fast; and a cage having radial fingers extending between the interlocating projections from a hub disposed substantially within the centre of the joint, said fingers holding the balls in a substantially common radial plane whereby relative sliding movement and/or inclination of the joint members is permitted.

3. A transmission joint of the character described and according to claim 2 wherein the radial fingers of the cage are in the form of resilient blades for lightly gripping the balls between them yet permit rotation of the latter.

4. A transmision joint of the character described comprising a pair of rotary joint members each having a coaxial bore and having eccentric axially parallel projections extending therefrom, said projections of said joint members all lying on a common circle and alternately interlocating with clearance between on another whilst said projections are formed with straight ball races of part cylindrical form having their axes parallel to that of the joint member from which they extend; balls retentively disposed between adjacent races of said interlocating projections such that the axes of the part cylindrical races of each adjacent pair thereof pass substantially through the centre of the ball therebetween for a substantial extent of driving contact with each ball in order to render the joint members rotationally fast; a cage having radial fingers extending between the interlocating projections from a hub disposed substantially within the centre of the joint, said fingers holding the balls in a substantially common radial plane whereby relative sliding movement and/or inclination of the joint members is permitted; and a pair of cage locating pins slidable one each in corresponding coaxial bores of the joint members, said pins being carried at their adjacent inner ends for universal movement by the hub of the cage at each side of the latter.

5. A transmission joint of the character described and according to claim 4 wherein compression springs are provided about the cage locating pins and acting between the joint members and the cage in order to urge the latter to a central position within the joint.

6. A transmission joint of the character described comprising a pair of rotary joint members each having a coaxial bore and having eccentric axially parallel projections extending therefrom, said projections of said joint members all lying on a common circle and alternately interlocating with clearance between one another whilst said projections are provided with straight ball races of part cylindrical form having their axes parallel to that of the joint member from which they extend; balls retentively disposed between adjacent races of said interlocating projections such that the axes of the part cylindrical races of each adjacent pair thereof pass substantially through the centre of the ball therebetween for a substantial extent of driving contact with each ball in order to render the joint members rotationally fast; a cage having radial fingers extending between the interlocating projections from a hub disposed substantially within the centre of the joint, said fingers holding the balls in a substantially common radial plane whereby relative sliding movement and/or inclination of the joint members is permitted; and a pair of cage locating pins slidable one each in corresponding co-axial bores of the joint members, said pins having heads of spherical form at their adjacent inner ends socketed within the hub of the cage for universal movement relative thereto, whilst said heads further have an intermeshing engagement with one another such that on the joint members being relatively inclined the cage is caused to assume a position with the plane of the centres of the balls retained thereby substantially bisecting the angle of inclination between the axes of the joint members.

7. A transmission joint of the character described and according to claim 6 wherein the said heads of the cage locating pins are annularly ribbed and grooved in a complementary manner at opposed faces whereby they have an intermeshing rib and groove engagement in any direction of relative inclination of the joint members.

References Cited in the file of this patent

UNITED STATES PATENTS

| | | |
|---|---|---|
| 1,627,932 | Scott | May 10, 1927 |
| 1,677,311 | Weiss | July 17, 1928 |
| 1,865,950 | Petskeyes | July 5, 1932 |
| 1,868,540 | Myers | July 26, 1932 |